Figure 1:
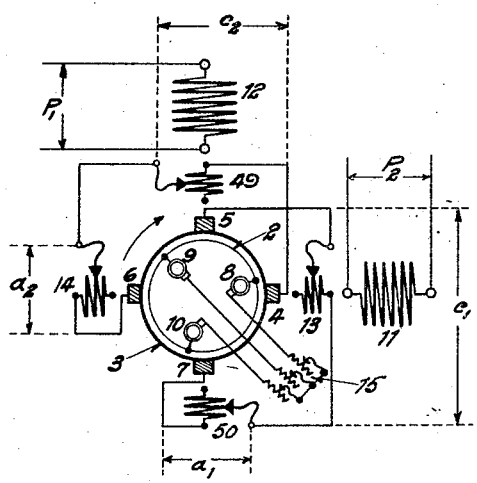

Oct. 26, 1926.

V. A. FYNN 1,604,898

ASYNCHRONOUS MOTOR

Filed July 5, 1924  2 Sheets-Sheet 1

Inventor:
VALÈRE ALFRED FYNN
John N. Bruninga
Attorney.

Oct. 26, 1926. 1,604,898

V. A. FYNN

ASYNCHRONOUS MOTOR

Filed July 5, 1924   2 Sheets-Sheet 2

Inventor:
VALÈRE ALFRED FYNN.
John N Bruninga
Attorney.

Patented Oct. 26, 1926.

1,604,898

UNITED STATES PATENT OFFICE.

VALÈRE ALFRED FYNN, OF ST. LOUIS, MISSOURI.

ASYNCHRONOUS MOTOR.

Application filed July 5, 1924. Serial No. 724,395.

My invention relates to asynchronous induction motors and particularly to the improvement or control of the power factor or to the compensation of such motors.

Generally speaking, my invention consists in producing the fundamental magnetization in a polyphase asynchronous motor, in other words, in producing the synchronously revolving field in such a machine from the secondary member and in excluding all load currents from that winding on the secondary which is used for producing this basic excitation. I exclude these load currents either at some particular load, at a plurality of loads or at all loads. To this end, I introduce into the secondary member auxiliary polyphase voltages of such phase and direction that one component of each of said voltages is of correct phase and direction to co-operate in producing the basic excitation of the machine, while the other component of each of said voltages is of the necessary phase and direction to co-operate in opposing the production or flow of load current in the exciting winding into which said voltages are introduced. In order to more fully eliminate load currents from the exciting winding at a plurality of loads or at all loads, I provide means for causing the phase of the auxiliary voltages to change with changing load and with respect to the phase of those voltages set up within the exciting winding which are ordinarily responsible for the load currents therein. This I accomplish either by changing the phase or the magnitude or both the phase and the magnitude of the introduced voltages or by changing the phase of the voltages set up within the exciting winding and ordinarily responsible for the load currents, which voltages may well be referred to as working voltages. I may also achieve this object by including a positive reactance in circuit with each auxiliary voltage and preferably varying its magnitude.

A voltage may be introduced into a winding either conductively or inductively.

To introduce a voltage into a winding conductively said voltage is conductively applied to the terminals of the winding. These terminals can be in the shape of slip rings, of terminals of the usual type, or of commutator bars and so forth, according to the type of winding. If the winding into which a voltage is to be conductively introduced forms part of a circuit which comprises elements other than a source of voltage, then the voltage introduced into said winding is that part of the voltage of the source which is available at the terminals of the winding in question and it may differ from the voltage of the source as to phase, or as to magnitude, or as to both. Under these conditions, as under all others, the voltage said to be introduced into the winding is that which is actually applied to its terminals regardless of the voltage at the source or sources or at the terminals of other elements within the circuit of said winding.

As a matter of fact no difference is seen between the expression introducing and impressing in this connection. A voltage may be impressed on a winding inductively as well as conductively, as is true of introducing, and in so far as this specification is concerned these terms are regarded as being synonymous.

In an ideal machine and at no load, the introduced or auxiliary voltages should lead the corresponding working voltages by 90 degrees. Under these conditions the auxiliary voltages will do no more than compensate the motor to a greater or less degree, depending on the magnitude of said auxiliary voltages. When this magnitude is such that the magnetization the auxiliary voltages produce from the secondary member is less than the basic magnetization usually produced in such machines from the primary member, then the magnetizing currents in the primary, which currents are of course lagging, will be reduced and the power factor of the machine correspondingly improved. If the magnitude of the auxiliary voltages is such as to produce from the secondary a basic magnetization equal to that ordinarily produced by the primary, then the magnetizing currents will be entirely eliminated from the primary and the power factor of the machine will be practically unity at no load. A further increase in the magnitude of these auxiliary introduced voltages will result in the primary taking leading currents from the supply in order to neutralize the excess magnetization produced from the rotor and the power factor of the machine will be still further improved if it is assumed that the power factor is best or a maximum when the primary currents lead the primary terminal voltages by 90 degrees and that it is worst when said currents lag behind said voltages by the same amount.

Under any load condition other than no load the auxiliary voltages introduced into the secondary must lead the corresponding working voltages in the winding into which they are introduced by more than 90 degrees, this angle of lead increasing as the load increases, in other words, as the slip of the asynchronous motor increases. When the phase of an auxiliary voltage E leads the corresponding working voltage e by more than 90 degrees, then the auxiliary voltage can be decomposed into an exciting component c responsible for the phase compensation and leading the corresponding working voltage e by 90 degrees and into a load current opposing component a leading the working voltage e by 180 degrees. The working voltage e increases with increasing load or with increasing slip, and if load current is to be excluded from the exciting winding on the secondary, then the component a of the auxiliary voltage should increase at the same rate as the working voltage. The exciting component of the auxiliary voltage, that which leads the working voltage by 90 degrees, determines the power factor of the machine and the latter will increase, decrease or remain constant according to whether this exciting component increases, decreases or remains constant as the lead of the auxiliary E. M. F. E is increased with increasing load.

It is known that in an ordinary polyphase asynchronous motor the secondary carries nothing but working currents, that these currents are reflected in the primary by transformer action and that in addition the primary carries the magnetizing currents which produce the basic excitation of the machine or the synchronously revolving field in such motor. As long as the secondary member carries a closed winding or a plurality of closed windings, load or working currents will appear in said winding or windings unless means are taken for preventing the development of such currents. I aim to produce the basic motor magnetization from the secondary member by means of an exciting winding from which load currents are partly or entirely excluded. To this end I employ two windings on the secondary member, the exciting winding just referred to and another closed winding adapted to carry load currents. In general, the exciting winding will be a commuted winding operating in conjunction with a polyphase arrangement of brushes and the load winding will be a squirrel cage, a slipring winding or any other kind of winding such as is used on the secondary of an ordinary polyphase motor. In general, the auxiliary voltages will be conductively introduced into the commuted exciting winding by means of the polyphase arrangement of brushes and can be derived from the supply through the instrumentality of the motor itself or by means of transformers independent of the motor. Under these conditions, the phase of the working voltages e will depend on the position of the polyphase arrangement of brushes cooperating with the commuted winding in relation to the axes of the primary inducing windings, and the phase of each introduced or auxiliary voltage E will depend on the phase of the source or sources from which said voltage is derived. If this voltage is derived from two sources, for instance from two phases of the supply or from two displaced windings located on the primary of the motor, then the phase of that auxiliary voltage can be varied, for instance by varying the relative magnitude of the components derived from the two sources. If it is desired to leave the phase of the auxiliary voltages unchanged but to vary the phase of the working voltages, then this can be achieved, for instance by displacing the polyphase arrangement of brushes with respect to the axes of the primary windings.

In a practical machine, the secondary must carry load currents even at no load because it takes a certain amount of power to run a motor light, and if it is desired to absolutely eliminate all load currents from that winding which is used as a secondary exciting winding, then the auxiliary voltage E must lead the working voltages by a little more than 90 degrees even at no load. Furthermore and because of the impedance drop in the primary, the secondary or working voltages are not exactly of opposite phase to the primary terminal voltages and this again slightly modifies what has been said as to phase relations in connection with an ideal motor, but it will be understood that while it may be sometimes desirable to take all these little differences into account, yet the adjustments herein referred to do not depend for their practical utility on such meticulous accuracy and reasonable departure one way or another from the specified best conditions will not materially affect the result.

The reactions in an asynchronous motor are such that it is possible to apply line frequency magnetizing currents to the secondary without being obliged to overcome an impedance proportional to the full line frequency and it is for this reason that the power factor of such machines can be improved if proper arrangements are made to excite them from the secondary instead of the primary.

While there is no great difficulty in so designing a commutator and brush gear as to reliability and efficiently carry nothing but exciting currents, which, as is well known, are considerably smaller than full load and of course much smaller than maximum load currents, and while such commutator and brush gear increases the cost of the machine but little, all the difficulties of design and successful operation as well as of cost increase very greatly so soon as the commutator and brush gear are to be dimensioned to take care of load currents, which, of course, includes the maximum load currents, and this is one of the reasons why the arrangements here disclosed have been devised; they permit to free the commutator and the brush gear from the necessity of carrying any load currents at all or to at least greatly reduce the load currents that are carried.

The objects and features of this invention will more clearly appear from the detailed description taken in connection with the accompanying drawings and will be pointed out in the claims.

In the accompanying diagrammatic two-pole drawings, Figs. 1, 2, 3, 4 and 5 show several embodiments of my invention, Figs. 6, 7, 8, 9 and 10 are explanatory diagrams.

Referring to Fig. 1, which illustrates a two-phase motor, the secondary, here the rotor, carries a polyphase slipring winding 2 adapted to be connected to starting or regulating resistances 15 by means of the sliprings 8, 9, 10 and brushes cooperating therewith, and a commuted winding 3 with which cooperates the two-phase arrangement of brushes 4, 6 and 5, 7, the axis of the first set being displaced by 90 electrical degrees from that of the second. The primary, here the stator, carries two windings 11, 12 displaced by 90 electrical degrees and four adjustable auxiliary windings 13, 14 and 49, 50. The auxiliary windings 13, 14 are coaxial with the primary 11, the auxiliary windings 49, 50 are coaxial with the primary 12. The brushes 4, 6 are located in line with the primary 11 and connected in circuit with the auxiliary stator windings 14 and 49, one of these being coaxial with the axis of the brushes 4, 6 and the other displaced by 90 electrical degrees thereto. Similarly, the brushes 5, 7 are connected in circuit with the auxiliary stator windings 50, 13, the winding 50 being in line with the axis of the brushes 5, 7 and the axis of the winding 13 being displaced by 90 electrical degrees with respect to the axis of said brushes. The secondary polyphase winding 2 carries nothing but load currents and the arrangement shown makes it possible to exclude everything but the exciting currents from the commuted winding 3. Auxiliary voltages E are for this purpose introduced into the winding 3 along two displaced axes by means of the polyphase arrangement of brushes shown and are derived from the supply by means of the auxiliary stator windings, the motor itself doing duty as transformer for the purpose of this derivation. Each auxiliary voltage is derived from two adjustable sources of phase displaced voltages $c$ and $a$, with the result that each of the auxiliary voltages can be varied as to phase, as to magnitude or as to both.

Figure 2:
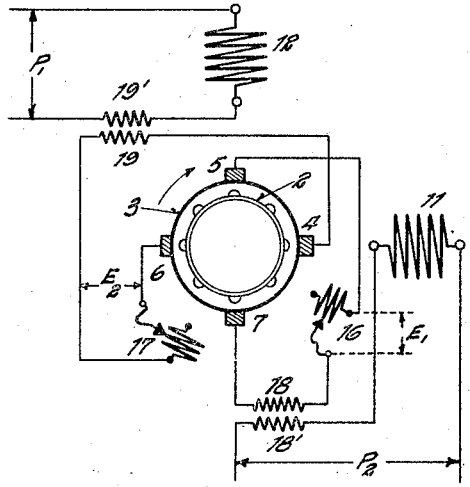

In Fig. 2 the rotor, which is the secondary, carries a squirrel cage 2 adapted to carry the secondary load currents and a commuted winding 3 from which all but the exciting currents can be excluded. A two-phase arrangement of brushes 4, 6 and 5, 7 co-operates with this commuted winding. The axes of the two sets of brushes are displaced by 90 electrical degrees and in this figure, as in all others, the brushes are supposed to rest directly on the commuted winding, thus eliminating all uncertainty as to their position. In practice a commutator and connections between said commutator and the winding would be used. The stator, here the primary, carries two windings 11, 12 displaced by 90 electrical degrees and two displaced adjustable, auxiliary windings 16, 17. The commuted winding 3 is closed along the axis of the primary winding 11 by means of the brushes 4, 6 connected in circuit with the auxiliary stator winding 17 and the primary 19 of a series transformer 19, 19', the secondary 19' of which is in series with the winding 12 the axis of which is displaced by 90 electrical degrees to the axis of the brushes 4, 6. This same commutated winding 3 is also closed along the axis of the primary winding 12 by means of the brushes 5, 7 connected in circuit with the auxiliary stator winding 16 and the primary 18 of the series transformer 18, 18', the secondary 18' of which is connected in series with the primary winding 11, whose axis is displaced by 90 electrical degrees with relation to the axis of the brushes 5, 7. In this case each of the two auxiliary voltages $E_1$, $E_2$ is derived from an auxiliary stator winding, the phase of that voltage with respect to the phase of the corresponding working voltage is determined by the position of the auxiliary stator winding from which it is derived with respect to the axis of the brushes to which it is connected. The primaries of the series transformers included in the two secondary circuits may be looked upon as variable impedances or variable positive reactances, varying with the magnitude of the primary currents.

Figure 3:
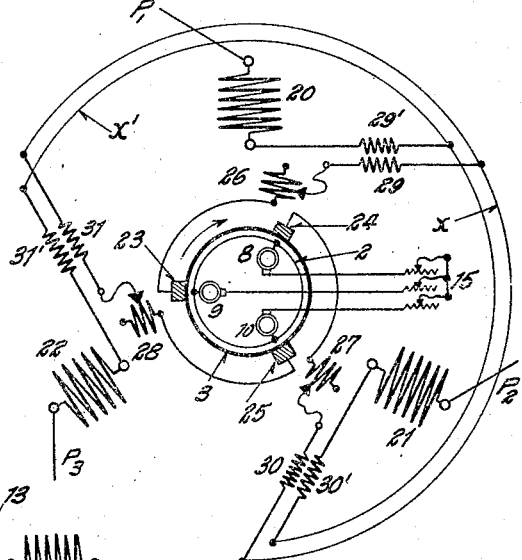

Fig. 3 shows, in the main, the arrangement of Fig. 2 as applied to a three-phase motor. The secondary, here the rotor, carries a polyphase winding 2 closed over adjustable resistances 15 by means of the sliprings 8, 9, 10 and brushes co-operating therewith, also a commuted winding 3 with which co-operate the brushes 23, 24, 25. The stator, here the primary, carries three primary windings 20, 21, 22 displaced by 120 electrical degrees and connected in star with the interposition of the secondaries 29', 30', 31' of three series transformers between said primary windings and the center or zero point $x'$ of the star. The stator further carries the auxiliary, adjustable stator windings 26, 27, 28 connected in star. The zero or center point of this star is at $x$. The primary of a series transformer is included between each of the auxiliary windings and $x$; the primary 29 being in circuit with the auxiliary 26, the primary 30 in circuit with 27, and the primary 31 in circuit with the auxiliary winding 28. Brush 23 is connected to the auxiliary winding 26, brush 24 to 27 and brush 25 to 28. The auxiliary voltages derived from the several auxiliary windings being thus impressed on the commuted winding 3 with the interposition of a variable impedance as in Fig. 2. The axis of the brushes 24, 25 is in line with the axis of the primary 20, the axis of the brushes 23, 24 coincides with the axis of 22 and that of the brushes 23, 25 with that of 21.

Figure 4:
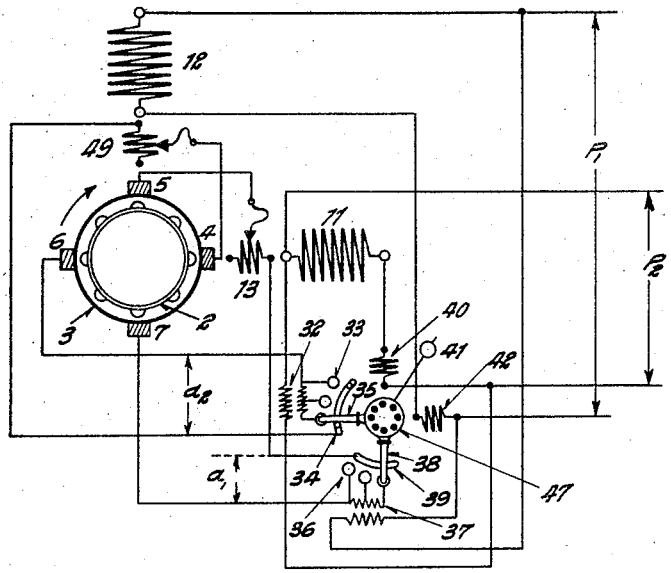

Referring to Fig. 4, the rotor, which is the secondary, carries a squirrel cage 2 and a commuted winding 3 with which co-operate the brush sets 4, 6 and 5, 7, the axes of which are displaced by 90 electrical degrees. The stator, here the primary, carries two windings 11, 12 adapted for connection to a two-phase supply, the terminal voltage of one phase being $P_1$ and that of the other $P_2$. It also carries two adjustable auxiliary windings 49 and 13, the first being coaxial with 12 and the second with 11. The primary of the shunt transformer 32 is connected to the supply phase $P_2$ and the primary of the shunt transformer 37 is connected to the supply phase $P_1$. The secondaries of both of these shunt transformers are adjustable, to which end the secondary of transformer 32 is provided with taps and contacts 33, while the secondary of 37 is provided with taps and contacts 36. Co-operating with the contacts 33 and the contact blade 34 is the arm 35 insulatingly carried by the rotor 47 of a relay or auxiliary polyphase motor 40, 42, 47 responsive to variations in the primary current. Similarly, the arm 38 insulatingly carried by the same rotor co-operates with the contacts 36 and the contact blade 39. Rotor 47 is impelled to move in a clockwise direction against one of the stops provided on the contact blade 34 under the influence of the weight 41. The inducing windings 40, 42, of this auxiliary motor impel the rotor 47 to move counterclockwise, the winding 40 being connected to the supply $P_2$ in series with 11 and the winding 42 being connected to the supply $P_1$ in series with 12. The secondary of the transformer 32 is included in circuit with the commuted winding 3 through the brushes 4, 6 and the auxiliary stator winding 49. The secondary of the shunt transformer 37 is included in circuit with the commuted winding 3 through the brushes 5, 7 and the auxiliary stator winding 13. The auxiliary winding 49 is displaced by 90 electrical degrees with respect to the brushes to which it is connected and makes available a voltage $c_2$ which is in phase quadrature with that voltage $a_2$ which is made available by the shunt transformer 32. Similarly the auxiliary stator winding 13 is displaced by 90 electrical degrees with respect to the brushes 5, 7 to which it is connected and makes available a voltage $c_1$ which is in phase quadrature with the voltage $a_1$ supplied by the shunt transformer 37. In this embodiment, each of the auxiliary voltages E injected into the secondary exciting circuit 3 has two components, one of which can be adjusted by hand while the other is adjusted by means of the auxiliary motor 40, 42, 47 in response to variations of the primary motor current.

Figure 5:
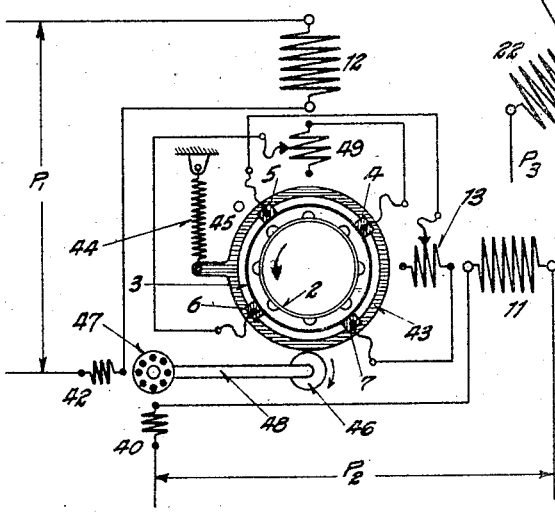

In Fig. 5, which represents a two-phase motor, the rotor, which is the secondary, carries a squirrel cage winding 2 adapted to take care of the load currents and a commuted winding 3 adapted to take care of the secondary exciting currents and from which more or less of the load currents can be excluded. A polyphase arrangement of brushes 4, 6 and 5, 7 co-operates with the commuted winding, all of the brushes being insulatingly carried by means of a brush rocker 43 which is movable and normally under the control of the spring 44 which holds the movable brush rocker arm against the stop 45. The stator or primary carries two windings 11, 12 displaced by 90 electrical degrees and connected to the supply. The stator also carries auxiliary adjustable windings 13 and 49, the first being coaxial with 11 and the second with 12. The auxiliary two-phase motor 40, 42, 47 is adapted to move the brush rocker arm 43 through the shaft 48 and the gear wheel 46 engaging with 43. This auxiliary motor comprises an ordinary squirrel cage rotor 47 and a stator provided with the two inducing windings 40, 42. The winding 40 is connected to the supply in series with the main motor winding 11 and the winding 42 is connected to the supply in series with the main motor winding 12. The auxiliary voltage $E_1$ derived from the auxiliary winding 13 is impressed on the commuted winding 3 through the brushes 5, 7. The auxiliary voltage $E_2$ derived from 49 is impressed on the commuted winding by means of the brushes 4, 6. The magnitude of the auxiliary voltages can be changed but not their phase. The phase of the working voltages with which these auxiliary voltages co-operate can, however, be modified by displacing the movable brush rocker arm 43. In this arrangement this arm is displaced in response to variations in the primary current of the motor. At no load the brushes 5, 7 are displaced by 90 electrical degrees from the auxiliary winding 13 to which they are connected and this displacement increases with increasing load. The same holds true of the brushes 4, 6 and the winding 49 to which they are connected.

It will be understood that while a two-phase arrangement of brushes on the secondary has been shown in connection with a two-phase primary and a three-phase arrangement of brushes on the secondary in connection with a three-phase primary, this coincidence of phases as to primary and secondary is by no means necessary. The primary may carry $n$ windings and the secondary may have an $m$-phase arrangement of brushes, in which the number $m$ differs from the number $n$ and both are greater than one.

Turning now to the mode of operation of the various embodiments here described and referring at first more particularly to Fig. 1, this machine may be started, with the help of the adjustable resistances 15, as is usual in the case of polyphase slipring motors. During this starting operation the two brush or exciting circuits may or may not be interrupted, as desired. Interrupting these brush circuits permits of more gradual starting and avoids overloading the commutator. After the machine has reached a nearly synchronous speed and the resistances 15 are shortcircuited, the motor is ready for operation as an ordinary asynchronous motor and no accident which may happen to the commutator or the brush gear will in any way incapacitate the machine for satisfactory operation as an asynchronous induction motor, for the reason that the working winding 2 is quite independent of the commutator and brush gear and dimensioned to carry all the secondary load currents of the machine. But such accident may interfere with the compensation of the machine.

It is known that in an ordinary polyphase asynchronous motor the primary produces a flux of practically constant magnitude which revolves at line frequency. If the secondary is movable, as in Fig. 1, it revolves with the basic flux produced by the primary. When the rotor runs synchronously its conductors cut no flux and have no voltages generated in them, as a consequence there are no currents in the secondary. The motor produces no torque at all and never reaches synchronism for that reason. When the rotor begins to slip, working voltages appear in all the rotor conductors, determine the flow of working currents in all of the rotor windings if said windings are closed and these secondary currents react with the revolving field of the motor to produce torque. With reference to the rotor itself, these voltages and currents are of slip frequency, with reference to an external element such as the stator or the brushes they are of line frequency. If the brushes 4, 6 and 5, 7 are directly interconnected, or shortcircuited, and the sliprings 8, 9, 10 are also shortcircuited, the load currents will divide between the load winding 2 and the exciting winding 3; those closing over the sliprings will be of slip frequency, and those closing over the brushes will be of line frequency. Whatever currents appear in the rotor are at once reflected in the stator because the two are in transformer relation and such currents will be set up in the latter, neutralizing or otherwise, as are necessary to maintain that basic magnetization which is required to counterbalance the primary terminal voltage.

Figure 6:
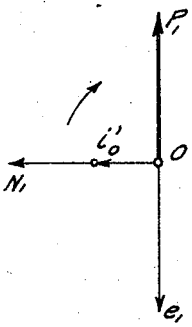

Let in Fig. 1 $P_2$ lead $P_1$ by 90 degrees. When $P_2$ is zero $P_1$ is at its negative maximum provided one assumes that from top to bottom of the paper and from left to right thereof is positive and that all vectors revolve clockwise. At the same time, the primary magnetizing current $i''_0$ in 11 together with the flux $N_2$ produced by 11 are at their negative maxima. At this time 12 produces no flux, $i'_0$ and $N_1$ are zero, see Fig. 6. The basic magnetization is equal to $N_2$ as to phase and magnitude and its axis coincides with that of 11. If the motor is slipping there will be no voltage at the brushes 4, 6 but the voltage $e_1$ appearing at the brushes 5, 7 will be in phase opposition with $N_2$ and is therefore at its positive maximum and in phase opposition to $P_1$ as shown in Fig. 6. When $P_2$ reaches its positive maximum, $P_1$ is zero and $N_1$ at its negative maximum. $N_1$ has no effect on the brush circuit 5, 7 which is coaxial with the axis of $N_1$ but, if the rotor is slipping, a voltage $e_2$ is generated in 3 at right angles to the axis of $N_1$ and therefore appears at the brushes 4, 6. This voltage is at its negative maximum and therefore in phase opposition with $P_2$. The voltages $e_1$ and $e_2$ are the working voltages in the two circuits of the exciting winding 3, their magnitude depends on the magnitude of the revolving flux and the slip and they determine the magnitude of the working currents. It is established that each is of opposite phase to the terminal voltage impressed on the primary winding coaxial with the brush axis along which that particular working voltage appears. Because the rotor has no positive reactance at synchronism and an extremely small one at ordinary slips, the secondary working currents are practically in phase with the working voltages.

It is observed that the phase of the working voltage at the brushes 4, 6 is 90 degrees in advance of the phase of the working voltage at the brushes 5, 7. If an intermediate pair of brushes was added, the phase of its working voltage would differ by 45 degrees from the phase of either of the others. Similarly if one or both brush sets were displaced the phase of the working voltages appearing at one or both sets would undergo a corresponding change in phase.

Since the synchronously running rotor has no positive reactance then any voltage impressed on the so running rotor will produce a current in phase with itself and a small slip will not materially change this result. In this the rotor differs materially from the stator, the positive reactance of which does not depend on the speed of the secondary. Because of the absence of positive reactance in the synchronously running rotor, it is possible to produce the basic motor magnetization or the revolving flux of the motor without a lagging current and by so producing said magnetization to reduce, eliminate or reverse the lagging or magnetizing current component of the stator. When this component is reversed it becomes leading and it does reverse when the rotor is overexcited.

Figure 7:
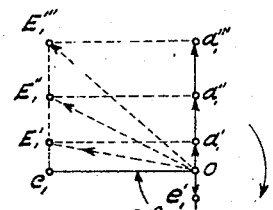

If the magnetization produced by the rotor is to take the place of the basic magnetization usually produced by the stator, then it must be of same phase and magnitude as the latter and the question arises how should the phase of each of the rotor exciting voltages be chosen with respect to, say, the working voltage appearing at the brushes on which the exciting voltage in question is to be impressed. Taking the brushes 5, 7 as positioned in Fig. 1 and assuming that at the instant chosen $P_1$ is at its negative maximum, as in Fig. 6, then $i'_0$ is zero and the compensating voltage $c_1$ to be impressed on 5, 7 should also be zero. But $P_2$ is zero when $P_1$ is a maximum and $c_1$ can therefore be derived from the phase $P_2$. When $P_1$ is zero $P_2$ is at its positive maximum and $i'_0$ is at its negative maximum, which means that $c_1$ must be of opposite phase to $P_2$. Now the working voltage $e_1$ at the brushes 5, 7 is of opposite phase to $P_1$ and since $c_1$ is to be of opposite phase to $P_2$ and $P_2$ leads $P_1$ by 90 degrees then $c_1$ must lead $e_1$ by 90 degrees. This is shown in Fig. 7. A similar consideration shows that in the circuit of the brushes 4, 6 the exciting voltage $c_2$ must lead the working voltage $e_2$ by 90 degrees. This holds true regardless of the position of the brushes with relation to the primary windings so that if the brushes are displaced from the positions they occupy in Fig. 1, the phases of the exciting voltages must be correspondingly displaced. Compensation is achieved equally well in any position of the brushes just so exciting voltages are introduced which lead the working voltages in their respective circuits by substantially 90 degrees.

In Fig. 1 the rotor exciting voltage $c_1$ for the circuit of the commuted or exciting winding 3 determined by the brushes 5, 7, is taken from the auxiliary winding 13 which yields a voltage in phase quadrature with the working voltage $e_1$ in that circuit, and it only remains to properly connect 13 to cause its voltage to lead $e_1$. Similarly $c_2$ is taken from 49 and connected to lead $e_2$ appearing at the brushes 4, 6 by 90 degrees. With these two voltages applied to the brush circuits of Fig. 1, the motor could be compensated at no load without any particular difficulty but under load conditions the working voltages $e_1$ and $e_2$ would make their appearance and the exciting winding 3 would carry ever increasing load currents which are better carried by the slipring winding 2, which interfere with compensation and which endanger commutation. The working voltages increase with slip as indicated by $e'_1$, $e''_1$ and $e'''_1$ in Fig. 7 for the circuit of the brushes 5, 7. In order to eliminate these working currents I introduce into the brush circuits load-current-opposing-voltages leading the working voltages by 180 degrees and increase their magnitudes as the magnitudes of the working voltages increase. These load current opposing voltages $a$ are shown in Fig. 7 for the circuit of the brushes 5, 7. If they are increased as the working voltages are increased the exciting winding will not be burdened with any load currents at all, if the changes in the two voltages do not correspond an additional current will flow. When the $e$'s exceed the $a$'s, the resulting currents produce a positive torque; if the opposite is true the resulting currents produce a negative torque and increase the slip. If the working-current-opposing-voltages $a$ do not always balance the working voltages, it is better for the latter to exceed the former, particularly near full load. The working current opposing voltages in Fig. 1 are taken from the winding 14 for the brushes 4, 6 and from the winding 50 for the brushes 5, 7. These auxiliary windings are coaxial with the axes of the brushes to which they are connected and provide voltages of same phase as the corresponding working voltages, to get them to oppose the latter is merely a matter of proper connection. In Fig. 1 the exciting and the working-current-opposing-voltages are regulated by hand.

As a matter of fact and except in the case of an ideal motor running at no load, I impress on or introduce into each brush circuit of Fig. 1 an auxiliary voltage E, the vectorial sum of $c$ and $a$, which leads the working voltage in each circuit by more than 90 degrees. I may select a certain average magnitude and phase for each of these auxiliary voltages E and let the load vary without further adjustment, in which case there will be but one load condition for which there will be nothing but exciting current in the secondary exciting winding 3. Or I may vary the phase of the E voltages in which case, and by suitable variation, I can eliminate the load currents at more than one load or even at all loads, but my rotor excitation will decrease with increasing load. Finally I can vary the phase as well as the magnitude of E, in which case and as seen in Fig. 7, I can eliminate the working currents from the exciting winding for as many load conditions as desired and either keep the rotor excitation constant or increase same with increasing load.

The winding 13 of Fig. 1 supplying the component $c_1$ and the winding 50 thereof supplying the component $a_1$ for the brush circuit 5, 7 have, in Fig. 2, been combined into a single auxiliary winding 16 capable of supplying the auxiliary voltage $E_1$, having the phase and magnitude of the resultant of $c_1$ and $a_1$ of Fig. 1. Similarly the winding 17 supplies $E_2$ for the brush circuit 4, 6. These auxiliary voltages can, for instance, be so chosen that each will yield at the maximum load of the motor a component $c$ of proper magnitude to produce the desired motor compensation and a component $a$ to fully oppose the then prevailing working voltage as graphically shown in Fig. 7. Noting that the rotor exciting current in each brush circuit is in phase with the exciting component $c$ of E, it is seen that the working voltage $e$ can in each case be looked upon as an E. M. F. of self induction or as a positive reactance voltage and I have therefore also conceived the idea of including a variable positive reactance in each brush circuit and of varying this reactance with varying load instead of varying the phase and magnitude of the auxiliary voltage E introduced in each brush circuit.

In Fig. 2, 18 and 19 are such variable reactances. Considering the circuit of the brushes 5, 7, I select $E_1$ derived from 16 so that when the positive reactance $x$ of 18 is a minimum the voltage actually impressed on the brushes 5, 7 has one exciting component $c_1$ of proper phase and magnitude and one load-current-opposing-component $a_1$ of proper phase and magnitude for maximum load conditions. Furthermore, I so select the maximum positive reactance $x$ of 18 that at no-load the components $c_1$ and $a_1$ again have the proper phase and magnitude. Under such conditions $c_1$ will remain practically constant but $a_1$ will vary considerably. The ohmic resistance $r$ of the whole circuit will be constant except for changes in temperature which may well be disregarded. I further provide means whereby the reactance $x$ of 18 is diminished as $e_1$ is increased. A reduction of $i_1 x$ sets a corresponding component of $E_1$ free to oppose the increment of $e_1$ and in this way the phase relation between $E_1$ and the rotor exciting current $i_1$ remains unaltered while a component of $E_1$ is always available to oppose any increase in $e_1$ or to oppose any increase in $i_1 x$ when $e_1$ diminishes with diminishing load.

To make the change of the reactance of 18 automatic I build this reactance in the shape of a series transformer, one winding 18 of which is in circuit with the brushes 5, 7 while the other 18′ is in circuit with one of the primary windings, the current in which varies with the load, and I so connect the two windings that the currents circulating through them oppose each other. The current through 18 is practically constant, that through 18′ increases with load and the turns can readily be so chosen that at maximum load the ampereturns in the two windings are such as to reduce $x$ to a minimum. When the two currents are of same phase $x$ is a minimum when the primary and secondary ampereturns are equal. It is preferable that the currents in 18 and in 18′ be of same phase or nearly so. It has been shown that the exciting current in the circuit of the brushes 5, 7 leads the working voltage in that circuit by 90 degrees and is therefore of opposite phase to the primary current in the winding 11 when the latter is in phase with $P_2$ and I therefore prefer to connect the remaining winding 18′ of the series transformer in circuit with brushes 5, 7 in series with the primary 11 displaced by 90 electrical degrees from the axis of the brushes 5, 7. Corresponding connections are made for all the brush circuits and, of course, operate in the same manner, for which reason one winding of the series transformer 19, 19′ is in series with the brushes 4, 6 and the other in series with the primary winding 12 in space quadrature to the axis of the brushes 4, 6.

The arrangement of Fig. 3 and its mode of operation are the same as those of Fig. 2 except that Fig. 3 is a three-phase as against a two-phase embodiment. The auxiliary voltage E impressed on brush 23 leads the working voltage in the circuit comprising this brush by more than 90 degrees and is derived from the correspondingly placed auxiliary stator winding 26. The secondary exciting current passing into or out of the commuted winding 3 by way of the brush 23 is in phase quadrature with $P_1$. The positive reactance in the circuit of brush 23 is the series transformer 29, 29′, the winding 29′ of which is connected in series with that primary winding 20 on which $P_1$ is impressed. The same arrangement is carried out for the two other phases.

Fig. 4 differs from Fig. 1 in that the load-current-opposing-components $a_1$ and $a_2$ of $E_1$ and $E_2$ are taken from adjustable shunt transformers 37, 32 external to the motor, while the compensating components $c_1$, $c_2$ of the introduced or auxiliary voltages $E_1$, $E_2$ are taken from the motor itself by way of the auxiliary windings 13 and 49 as in Fig. 1. In addition, the components $a$ are varied in accordance with the load or the slip of the motor by means of the polyphase motor-relay 40, 42, 47, each primary inducing winding of which is connected in series with one of the primary windings 11, 12 of the main motor. The windings 40, 42 are so dimensioned that at no load the rotor 47 of the motor-relay is under the control of the weight 41. At this time both $a_1$ and $a_2$ are zero. As the load increases the currents through 40 and 42 and the voltages at the terminals of these windings increase and the torque exerted by 47 increases, overpowers the weight 41 and moves the contact arms 38, 35 in a counterclockwise direction. This increases $a_1$ and $a_2$ and if the taps on the secondaries of the transformers 32, 37 are properly chosen the increase of $a_1$ and $a_2$ will keep pace with the increase of the corresponding working voltages $e_1$ and $e_2$, thus keeping the commuted winding free from load currents without in any way interfering with the excitation of the secondary which depends on the components $c_1$, $c_2$ and is responsible for the desired phase compensation.

In Fig. 5 the polyphase arrangement of brushes is movable. At no-load the brush rocker arm 43 is under the control of the spring 44 and rests against the stop 45. The inducing windings 40, 42 of the auxiliary motor 40, 42, 47 are each connected in series with one of the windings 11, 12 of the main motor and so dimensioned that with the no-load current of the main motor circulating through these windings the rotor 47 of the auxiliary motor does not exert enough torque to move the brush rocker arm 43 away from the stop 45. But as the load on the main motor increases 47 overpowers 44 and 43 is moved in a counterclockwise direction and with the rotation of the secondary and of the basic magnetization of the machine.

Figure 8:
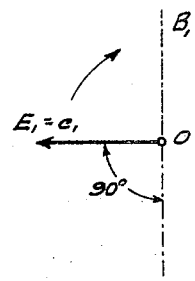
Figure 9:
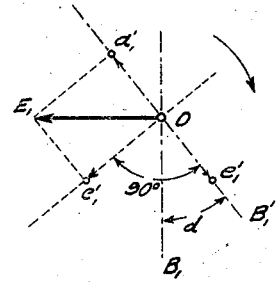
Figure 10:
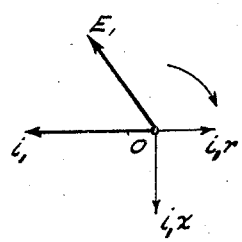

When 43 is in its no-load position the brushes 5, 7 are in line with the axis of 12 and the brushes 4, 6 in line with the axis of 11. The auxiliary voltages $E_1$ and $E_2$ derived respectively from the auxiliary stator windings 13 and 49 are at this time of the proper phase to excite the motor from the secondary, as shown in Fig. 8, where $B_1$ indicates the axis of the brushes 5, 7 and the phase of the working voltage which at no-load is very small, positive and not shown in Fig. 8. At no-load all of $E_1$ does duty as $c_1$ in the circuit of the brushes 5, 7 and all of $E_2$ does duty as $c_2$ in the circuit of the brushes 4, 6. As the load increases $e_1$ increases and the brushes are displaced with rotation. This movement of the brushes does not change the magnitude of $e_1$ or of $e_2$ but changes the phases thereof with respect to the phases of $E_1$ and $E_2$ in proportion to the angle $d$ by which the brushes have been displaced from their original no-load position. The magnitude of $e_1$ and of $e_2$ simply changes with the slip regardless of the space location of the brushes. When the brushes are moved by 47 from the axis $B_1$ of Fig. 9 to the axis $B'_1$ in response to an increase in load then $e_1$ increases from the very small value it had in Fig. 8 to the value $e'_1$ shown in Fig. 9 and it is seen that $E_1$ now leads $e'_1$ by more than 90 degrees. Under these conditions, and as explained in connection with Fig. 7, the auxiliary votage $E_1$ introduced into the brush circuit 5, 7 is decomposed into a component $c'_1$ which leads $e'_1$ by 90 degrees and a component $a'_1$ which leads it by 180 degrees. The auxiliary motor and the spring 44 can be so dimensioned that the working-current-opposing-component $a_1$ of $E_1$ is at each load practically equal to the corresponding working voltage $e_1$, in which case the exciting winding 3 will be kept practically free from load currents. It is seen that under the conditions named and shown in Fig. 5 the component $c_1$, responsible for the excitation of the secondary, diminishes with increasing brush displacement, that is with increasing load, because $E_1$ remains constant as to magnitude unless adjusted by hand. A very satisfactory way of operating the embodiment shown in Fig. 5 is to so select the magnitude of the auxiliary voltages that the power factor of the motor will be unity at a selected load, for instance at full load, and leave the magnitudes of these introduced voltages constant, allowing the power factor to rise with falling load and to fall when the load exceeds the selected load.

Throughout this specification the term primary member is applied to that member which carries the windings connected to the supply, which windings carry the line working currents, and whether or not these primary windings produce the revolving flux of the motor which flux always revolves synchronously with respect to the primary member. The other member is referred to as secondary whether or not it carries a winding or windings which produce all or a part of the revolving flux.

It is well known that any motor can be operated as a generator provided it be driven by a prime mover at a suitable speed, and it is also generally recognized that non-synchronous polyphase motors are no exception to this rule. It is further known that in the case of an asynchronous motor the voltages generated by the primary flux in any winding on the secondary change their direction when the machine passes from sub to super-synchronous speeds, thereby causing the machine to send working currents back to the line instead of drawing such currents from the supply. To keep the exciting circuits free from other than exciting currents is, of course, desirable whether the machine operates as a motor or as a generator. It is, therefore, to be understood that the terms used with reference to motor structures and operation are employed descriptively rather than limitatively.

It is immaterial whether it is the secondary or the primary which revolves, the mode of operation remains exactly the same. When the primary revolves it rotates against the direction of rotation of the revolving field or of the basic magnetization of the motor. The commuted winding is then located on the stationary member and the co-operating brushes revolve with the primary. Brush displacements are the same when referred to the revolving flux but opposite when referred to the direction of rotation of the revolving member.

To what extent the invention is taken advantage of depends on the preference of the user. When load currents are practically eliminated from the exciting winding on the secondary the conditions are very favorable. The magnetic circuit of the motor should preferably have no polar projections and may be designed as is usual in asynchronous polyphase motor practice but in dimensioning the circuits it should be remembered that the primary windings in such a motor carry nothing but working currents, and not working and magnetizing currents as in the ordinary polyphase motor, and that one of the windings on the secondary carries nothing but secondary load or working currents while the other winding on the secondary carries nothing but exciting currents. This last is the commuted winding 3 and its commutator and brushes need only be dimensioned to take care of the exciting ampere-turns which are small in such machines because of the small air gap. These ampere-turns may remain constant at all loads and the commutator voltage may be chosen as low as desired.

Such subject matter as is disclosed in connection with my Fig. 5 and not specifically claimed in this application is specifically claimed in application Serial Number 126,687 filed by me August 2, 1926.

While theories have been advanced in connection with the machines referred to herein, this has been done with a view to facilitating their description and understanding, but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

Having thus described the invention, what I claim is:

1. The method of operating an asynchronous polyphase motor the torque of which depends on a flux moving synchronously with respect to the primary which comprises, generating polyphase working voltages in independent secondary circuits, allowing the free formation of working or torque producing currents in one of the secondary circuits, and introducing into the other secondary circuit auxiliary polyphase voltages of such phase that one component of each of said voltages produces part of the synchronously moving flux while the other opposes one of the working current producing voltages generated in said other secondary.

2. The method of operating an asynchronous polyphase motor the torque of which depends on a flux moving synchronously with respect to the primary which comprises, generating polyphase working voltages in independent secondary circuits, allowing the free formation of working or torque producing currents in one of the secondary circuits, introducing into the other secondary circuit auxiliary polyphase voltages of such phase that one component of each of said voltages produces part of the synchronously moving flux while the other opposes one of the working current producing voltages generated in said other secondary, and varying the phase of the introduced voltage with varying load on the motor.

3. The method of operating an asynchronous polyphase motor the torque of which depends on a flux moving synchronously with respect to the primary which comprises, generating polyphase working voltages in independent secondary circuits, allowing the free formation of working or torque producing currents in one of the secondary circuits, introducing into the other secondary circuit auxiliary polyphase voltages of such phase that one component of each of said voltages produces part of the synchronously moving flux while the other opposes one of the working current producing voltages generated in said other secondary, and varying the magnitude of the introduced voltage with varying load on the motor.

4. The method of operating an asynchronous polyphase motor the torque of which depends on a flux moving synchronously with respect to the primary which comprises, generating polyphase working voltages in independent secondary circuits, allowing the free formation of working or torque producing currents in one of the secondary circuits, introducing into the other secondary circuit auxiliary polyphase voltages of such phase that one component of each of said voltages produces part of the synchronously moving flux while the other opposes one of the working current producing voltages generated in said other secondary, and varying the magnitude and the phase of the introduced voltage with varying load on the motor.

5. The method of operating an asynchronous polyphase motor the torque of which depends on a flux moving synchronously with respect to the primary which comprises, generating polyphase working voltages in independent secondary circuits, allowing the free formation of working or torque producing currents in one of the secondary circuits, introducing into the other secondary circuit auxiliary polyphase voltages of such phase that one component of each of said voltages produces part of the synchronously moving flux while the other opposes one of the working current producing voltages generated in said other secondary, and varying with varying load on the motor the phase relation between the working current producing voltages and the introduced voltages.

6. The method of operating an asynchronous polyphase motor the torque of which depends on a flux moving synchronously with respect to the primary which comprises, generating polyphase working voltages in independent secondary circuits, allowing the free formation of working or torque producing currents in one of the secondary circuits, introducing into the other secondary circuit auxiliary polyphase voltages of such phase that one component of each of said voltages produces part of the synchronously moving flux while the other opposes one of the working current producing voltages generated in said other secondary, and varying with varying load on the motor the impedance of the circuits comprising the introduced voltages.

7. The method of operating an asynchronous polyphase motor the torque of which depends on a flux moving synchronously with respect to the primary which comprises, generating polyphase working voltages in independent secondary circuits, allowing the free formation of working or torque producing currents in one of the secondary circuits, introducing into the other secondary circuit auxiliary polyphase voltages of such phase that one component of each of said voltages produces part of the synchronously moving flux while the other opposes one of the working current producing voltages generated in said other secondary, and increasing the lead of the introduced voltages over the working current producing voltages with increasing motor load.

8. The method of operating an asynchronous polyphase motor the torque of which depends on a flux moving synchronously with respect to the primary which comprises, generating polyphase working voltages in independent secondary circuits, allowing the free formation of working or torque producing currents in one of the secondary circuits, introducing into the other secondary circuit auxiliary polyphase voltages of such phase that one component of each of said voltages produces part of the synchronously moving flux while the other opposes one of the working current producing voltages generated in said other secondary, and increasing the magnitude of the introduced voltages and their lead over the working current producing voltages with increasing motor load.

9. In an asynchronous polyphase motor, a primary, a secondary, a commuted and another winding on the secondary, and means for introducing into the commuted winding auxiliary polyphase voltages leading in phase by about 90 degrees the working voltages appearing in said commuted winding at the points at which the auxiliary polyphase voltages are introduced.

10. In an asynchronous polyphase motor, a primary, a secondary, a commuted and another winding on the secondary, and means for introducing into the commuted winding auxiliary polyphase voltages leading in phase by more than 90 degrees the working voltages appearing in said commuted winding at the points at which the auxiliary polyphase voltages are introduced.

11. In an asynchronous polyphase motor, a primary, a secondary, a commuted and another winding on the secondary, means for introducing into the commuted winding auxiliary polyphase voltages leading in phase by about 90 degrees the working voltages appearing in said commuted winding at the points at which the auxiliary polyphase voltages are introduced, and means for varying the phase of the auxiliary voltages.

12. In an asynchronous polyphase motor, a primary, a secondary, a commuted and another winding on the secondary, means for introducing into the commuted winding auxiliary polyphase voltages leading in phase by more than 90 degrees the working voltages appearing in said commuted winding at the points at which the auxiliary polyphase voltages are introduced, and means for varying the magnitude of the auxiliary voltages.

13. In an asynchronous polyphase motor, a primary, a secondary, a commuted and another winding on the secondary, means for introducing into the commuted winding auxiliary polyphase voltages leading in phase by about 90 degrees the working voltages appearing in said commuted winding at the points at which the auxiliary polyphase voltages are introduced, and means for varying the phase and magnitude of the auxiliary voltages.

14. In an asynchronous polyphase motor, a primary, a secondary, a commuted and another winding on the secondary, means for introducing into the commuted winding auxiliary polyphase voltages leading in phase by about 90 degrees the working voltages appearing in said commuted winding at the points at which the auxiliary polyphase voltages are introduced, and means for changing the phase relation between the working and the auxiliary voltages.

15. In an asynchronous polyphase motor, a primary, a secondary, a commuted and another winding on the secondary, means for introducing into the commuted winding auxiliary polyphase voltages leading in phase by more than 90 degrees the working voltages appearing in said commuted winding at the points at which the auxiliary polyphase voltages are introduced, said means including a positive reactance in the circuit of each of the auxiliary voltages.

16. In an asynchronous polyphase motor, a primary, a secondary, a commuted and another winding on the secondary, means for introducing into the commuted winding auxiliary polyphase voltages leading in phase by more than 90 degrees the working voltages appearing in said commuted winding at the points at which the auxiliary polyphase voltages are introduced, a positive reactance in the circuit of each of the auxiliary voltages, and means for varying the magnitude of said reactance.

17. In an asynchronous polyphase motor, a primary, a secondary, a commuted and another winding on the secondary, means for introducing into the commuted winding auxiliary polyphase voltages leading in phase by more than 90 degrees the working voltages appearing in said commuted winding at the points at which the auxiliary polyphase voltages are introduced, a positive reactance in the circuit of each of the auxiliary voltages, and automatic means for varying the magnitude of said reactance.

18. In an asynchronous polyphase motor, a primary, a secondary, a commuted and another winding on the secondary, means for introducing into the commuted winding auxiliary polyphase voltages leading in phase by more than 90 degrees the working voltages appearing in said commuted winding at the points at which the auxiliary polyphase voltages are introduced, a positive reactance in the circuit of each of the auxiliary voltages, and means dependent on the load for varying the magnitude of said reactance.

19. In an asynchronous polyphase motor, a primary, a secondary, a commuted and another winding on the secondary, means for introducing into the commuted winding auxiliary polyphase voltages leading in phase by about 90 degrees the working voltages appearing in said commuted winding at the points at which the auxiliary polyphase voltages are introduced, and means for increasing the lead of the auxiliary over the working voltages as the motor load increases.

20. In an asynchronous polyphase motor, a primary, a secondary, a commuted and another winding on the secondary, means for introducing into the commuted winding auxiliary polyphase voltages leading in phase by about 90 degrees the working voltages appearing in said commuted winding at the points at which the auxiliary polyphase voltages are introduced, and automatic means for increasing the lead of the auxiliary over the working voltages as the motor load increases.

21. In an asynchronous polyphase motor, a primary, a secondary, a commuted and another winding on the secondary, means for introducing into the commuted winding auxiliary polyphase voltages leading in phase by about 90 degrees the working voltages appearing in said commuted winding at the points at which the auxiliary polyphase voltages are introduced, and means for increasing with increasing motor load the magnitude of the auxiliary voltages and their lead over the working voltages.

22. In an asynchronous polyphase motor, a primary, a secondary, a plurality of windings on the primary adapted for connection to the supply, a closed and a commuted winding on the secondary, a polyphase arrangement of brushes co-operating with the commuted winding, means including the brushes for conductively impressing auxiliary polyphase voltages on the commuted winding, said voltages leading by at least 90 degrees the voltages generated in the commuted winding by the basic magnetization of the motor, and a series transformer in circuit with each of said auxiliary windings, the second winding of each transformer being in circuit with one of the inducing windings on the primary.

23. In an asynchronous polyphase motor, a primary, a secondary, a plurality of windings on the primary adapted for connection to the supply, a closed and a commuted winding on the secondary, a polyphase arrangement of brushes co-operating with the commuted winding, and a polyphase arrangement of auxiliary windings on the primary of a number of phases equal to that of the polyphase arrangement of brushes, an auxiliary winding being included in each phase of the polyphase arrangement of brushes and located in an axis displaced by more than 90 electrical degrees from the axis of said phase.

24. In an asynchronous polyphase motor, a primary, a secondary, a plurality of windings on the primary adapted for connection to the supply, a closed and a commuted winding on the secondary, a polyphase arrangement of brushes co-operating with the commuted winding, a polyphase arrangement of auxiliary windings on the primary of a number of phases equal to that of the polyphase arrangement of brushes, an auxiliary winding being included in each phase of the polyphase arrangement of brushes and located in an axis displaced from the axis of said phase, and a positive reactance in circuit with each auxiliary winding.

25. In an asynchronous polyphase motor, a primary, a secondary, a plurality of windings on the primary adapted for connection to the supply, a closed and a commuted winding on the secondary, a polyphase arrangement of brushes co-operating with the commuted winding, a polyphase arrangement of auxiliary windings on the primary of a number of phases equal to that of the polyphase arrangement of brushes, an auxiliary winding being included in each phase of the polyphase arrangement of brushes and located in an axis displaced from the axis of said phase, and a series transformer in circuit with each auxiliary winding one winding of each series transformer being connected in series with one of the inducing windings on the primary.

26. In an asynchronous polyphase motor, a primary, a secondary, a commuted and another winding on the secondary, and means means for introducing into the commuted winding auxiliary polyphase voltages differing in phase by more than 90 degrees from the working voltages appearing in said commuted winding at the points at which the auxiliary polyphase voltages are introduced.

27. In an asynchronous polyphase motor, a primary, a secondary, a commuted and another winding on the secondary, means for introducing into the commuted winding auxiliary polyphase voltages differing in phase by about 90 degrees from the working voltages appearing in said commuted winding at the points at which the auxiliary polyphase voltages are introduced, and means for varying the phase of the auxiliary voltages.

28. In an asynchronous polyphase motor, a primary, a secondary, a commuted and another winding on the secondary, means for introducing into the commuted winding auxiliary polyphase voltages differing in phase by at least 90 degrees from the working voltages appearing in said commuted winding at the points at which the auxiliary polyphase voltages are introduced, and an impedance in the circuit of each of the auxiliary voltages.

29. The method of operating an asynchronous polyphase motor the torque of which depends on a flux moving synchronously with respect to the primary, which comprises, generating polyphase working voltages of slip frequency in independent secondary circuits, allowing the free formation of working or torque producing currents in one of the secondary circuits, producing auxiliary polyphase voltages of line frequency, changing the frequency of the auxiliary voltages from line to slip frequency, and introducing them into the other secondary circuit to produce at least part of the synchronously moving flux and to oppose the working voltages generated in said other secondary circuit.

30. In an asynchronous polyphase motor, a primary, a secondary, a commuted and another winding on the secondary, and means for introducing into the commuted winding auxiliary polyphase voltages differing in phase by more than ninety degrees from the phase of the working voltages appearing in said commuted winding at the points at which the auxiliary polyphase voltages are introduced.

31. The method of operating an asynchronous polyphase motor the torque of which depends on a flux moving synchronously with respect to the primary, which comprises, generating polyphase working voltages of slip frequency in two polyphase secondary circuits, allowing the free formation of working or torque producing currents in one of the secondary circuits, producing auxiliary polyphase voltages of line frequency, changing the frequency of the auxiliary voltages from line to slip frequency, and introducing the polyphase slip frequency voltages into the other secondary circuits to produce at least part of the synchronously moving flux and opposing the formation of working currents in this other secondary.

32. In an asynchronous polyphase motor, a primary, a secondary, polyphase load and exciting circuits on the secondary in inductive relation to the primary the load circuits being dimensioned to facilitate the formation of load currents therein, means for introducing auxiliary polyphase voltages of secondary frequency into the secondary exciting circuits to control the power factor of the motor, and means for opposing the formation of load currents in said secondary exciting circuits.

33. In an asynchronous polyphase motor, a primary, a secondary, load and exciting circuits on the secondary in inductive relation to the primary, and means for opposing the formation of load currents in said secondary exciting circuits.

34. In an asynchronous polyphase motor, a primary, a secondary, polyphase working or load and exciting circuits on the secondary in inductive relation to the primary, means comprising one of said secondary polyphase circuits for producing at least part of the revolving field of the motor, and means for maintaining the currents in the revolving field producing secondary circuits approximately constant irrespective of motor load variations.

35. In an asynchronous polyphase motor, a primary, a secondary, polyphase working or load and exciting circuits on the secondary in inductive relation to the primary the working circuits being dimensioned to facilitate the formation of working currents therein, means comprising one of said secondary polyphase circuits for producing at least part of the revolving field of the motor, and means for opposing the formation of working currents in the revolving field producing secondary circuits.

36. In an asynchronous polyphase motor, a primary, a secondary, polyphase working or load and exciting circuits on the secondary in inductive relation to the primary, means comprising one of said secondary polyphase circuits for producing at least part of the revolving field of the motor, and means for excluding working currents from the revolving field producing circuits at a given motor load.

37. In an asynchronous polyphase motor, a primary, a secondary, polyphase working and exciting circuits on the secondary in inductive relation to the primary to allow working voltages to be generated in each of the secondary circuits, means for introducing auxiliary polyphase voltages into the secondary exciting circuits, positive reactances in circuit with the secondary exciting circuits, and means for keeping approximately constant at a plurality of motor loads the sum of the working voltage generated in an exciting circuit and the voltage at the terminals of the positive reactance in circuit with said exciting circuit.

38. In an asynchronous polyphase motor, a primary, a secondary, polyphase working and exciting circuits on the secondary in inductive relation to the primary to allow working voltages to be generated in each of the secondary circuits, means for introducing into the secondary exciting circuits auxiliary polyphase voltages leading the working voltages generated in said circuits by substantially more than 90 degrees, positive reactances in circuit with the secondary exciting circuits, and means for keeping approximately constant at a plurality of motor loads the sum of the working voltage generated in an exciting circuit and the voltage at the terminals of the positive reactance in circuit with said exciting circuit.

In testimony whereof I affix my signature this 26th day of June, 1924.

VALÈRE ALFRED FYNN.